TRANSMITTER

INVENTOR
J. C. CANDY
BY Leonard A. Arnold
ATTORNEY

RECEIVER 3,550,004
Patented Dec. 22, 1970

3,550,004

FEEDBACK CODERS USING WEIGHTED CODE COMPANDING ON STRINGS OF EQUAL BITS

James C. Candy, Convent Station, N.J., assignor to Bell Telephone Laboratories, Incorporated, Murray Hill and Berkeley Heights, N.J., a corporation of New York Filed Dec. 13, 1968, Ser. No. 783,507
Int. Cl. H03k *13/22;* H04l *3/00*
U.S. Cl. 325—38 9 Claims

ABSTRACT OF THE DISCLOSURE

A one-bit feedback coder is companded by increasing its step size when a string of equal bits is detected in the transmitted code. The weight sequence (absolute magnitude) 1, 1, 2, 3, 5 . . . 5 is used to code and decode each string and the weight is returned to unity when the string ends. In accordance with a feature of this invention, the weighting circuit is outside the feedback loop and each output signal serves to send either of two weighted values to a subtraction circuit at the input of the coder to encode the next sample, thereby permitting very high speed operation. As a result of moving the weighting circuit outside the feedback loop the inherent low frequency instability of direct feedback current coders employing weighted companding is eliminated.

This invention relates to pulse transmission systems, and more particularly to improvements in feedback coders for use in such transmission systems.

BACKGROUND OF THE INVENTION

The widespread use of digital computers and the advent of low priced integrated circuits encourage the use of digital representation of analog signals. In transmission systems such digital representation of analog signals reduces errors during transmission, but the inherent quantization of the analog signal values often places a limitation on systems accuracy. Many methods for reducing these quantization errors have been proposed, the best known of which are delta modulation and differential coding.

Delta modulation is one of the simplest and best known coding methods. It changes its analog output positively or negatively by a fixed increment at regular instants. Differential coding is a related method where at regular instants the output changes by one of a set of prescribed values. Delta modulation is regarded as one-bit differential coding because at each sampling time it transmits either of two codes, a pulse or space, representing a positive or negative step, respectively.

Direct feedback coders function the same way as differential coders, but the circuit is arranged to allow greater flexibility of filter design. Basically, a direct feedback coder employs a signal integration process preceding the pulse modulator with the output pulses from the modulator fed back and subtracted from the input signal. It is the difference signal which is then integrated and applied to the pulse modulator. The pulse modulator compares the amplitude of the integrated difference signal with the preceding reference level. Functionally, it may be thought of as a gate opening to pass a pulse from a pulse generator when the difference signal is larger than the reference level and closing the gate when the difference signal is smaller than the reference level. As a result, the integrated difference signal is always kept in the vicinity of the reference level, provided that the input signal is not too large. Thus, the output pulses carrying the information correspond to the input signal amplitude. A coder of this type is described in an article by Hiroshi Inose and Yasuhiko Yasuda entitled, "A Unity Bit Coding Method by Negative Feedback" shown in FIG. 2 on page 1524 of the November 1963 Proceedings of the IEEE.

Conventionally, all three of the above-mentioned types of coders use one-bit coding. For example, in a simple form of delta modulation the transmitted pulses are applied to identical integrating circuits at the transmitter and receiver. Prior to the transmission of each pulse, the output from the integrator at the transmitter is compared with the original analog signal. If the original analog signal is larger than the output from the integrator, a positive pulse is transmitted to build up the integrator output; while if the original signal is smaller than that from the integrator, a negative pulse is transmitted to reduce the integrator output. Normally, therefore, the output of the integrator at the transmitter deviates from the input signal by less than the magnitude of one pulse. The delta modulation receiver includes a duplicate integrator circuit followed by a low pass filter to reduce the noise introduced by the pulse form of transmission. The output of the integrator at the receiver is identical with that at the transmitter, and is therefore a good approximation of the original analog signal. However, when the slope of the original input signal amplitude versus time characteristic becomes too steep a delta modulation coder of this type is overloaded and substantial distortion is introduced. Since the integrator output builds up a step at a time it may take considerable time for the integrator output to build up to the level of the analog input signal. This phenomenon is most apparent when it becomes necessary to encode a step input signal. In order to overcome the distortion introduced in such a simple form of encoder one-bit coders have been companded by increasing the step size when a string of pulses is transmitted. The step size is increased in response to the transmission of a string of equal bits with step size returned to unity when the string of equal bits is broken. A coder employing these techniques is shown in "Pictorial Transmission with H.I.D.M." by M. R. Winkler, published in the 1965 IEEE International Convention Record, Part I, pages 285 to 290. While such circuits have been found to have technical advantages, particularly when the step size has been empirically determined in order to attain a desired goal, these circuits have been found to be lacking in that there is insufficient time for each decision of the threshold circuit to be sent around the feedback loop to fully influence the next decision. As a result, it has been found that as a practical matter the circuit possesses low frequency instability.

It is therefore an object of this invention to overcome the low frequency instability of feedback coders employing weighted code sequences.

SUMMARY OF THE INVENTION

A one-bit feedback coder is companded by increasing its step size when a string of equal bits is detected in the transmitted code. The weight sequence (absolute magnitude) 1, 1, 2, 3, 5 . . . 5 is used to code and decode each string and the weight is returned to unity when the string ends. In accordance with a feature of this invention, the weighting circuit is outside the feedback loop and each output signal serves to send either of two weighted values to a subtraction circuit at the input of the coder to encode the next sample, thereby permitting very high speed operation. While the invention is described in terms of a direct feedback coder it is equally applicable to either delta or differential modulation. As a result of moving the weighting circuit outside the feedback loop the inherent low frequency instability of direct feedback current coders employing weighted companding is eliminated.

DETAILED DESCRIPTION

Figure 1:
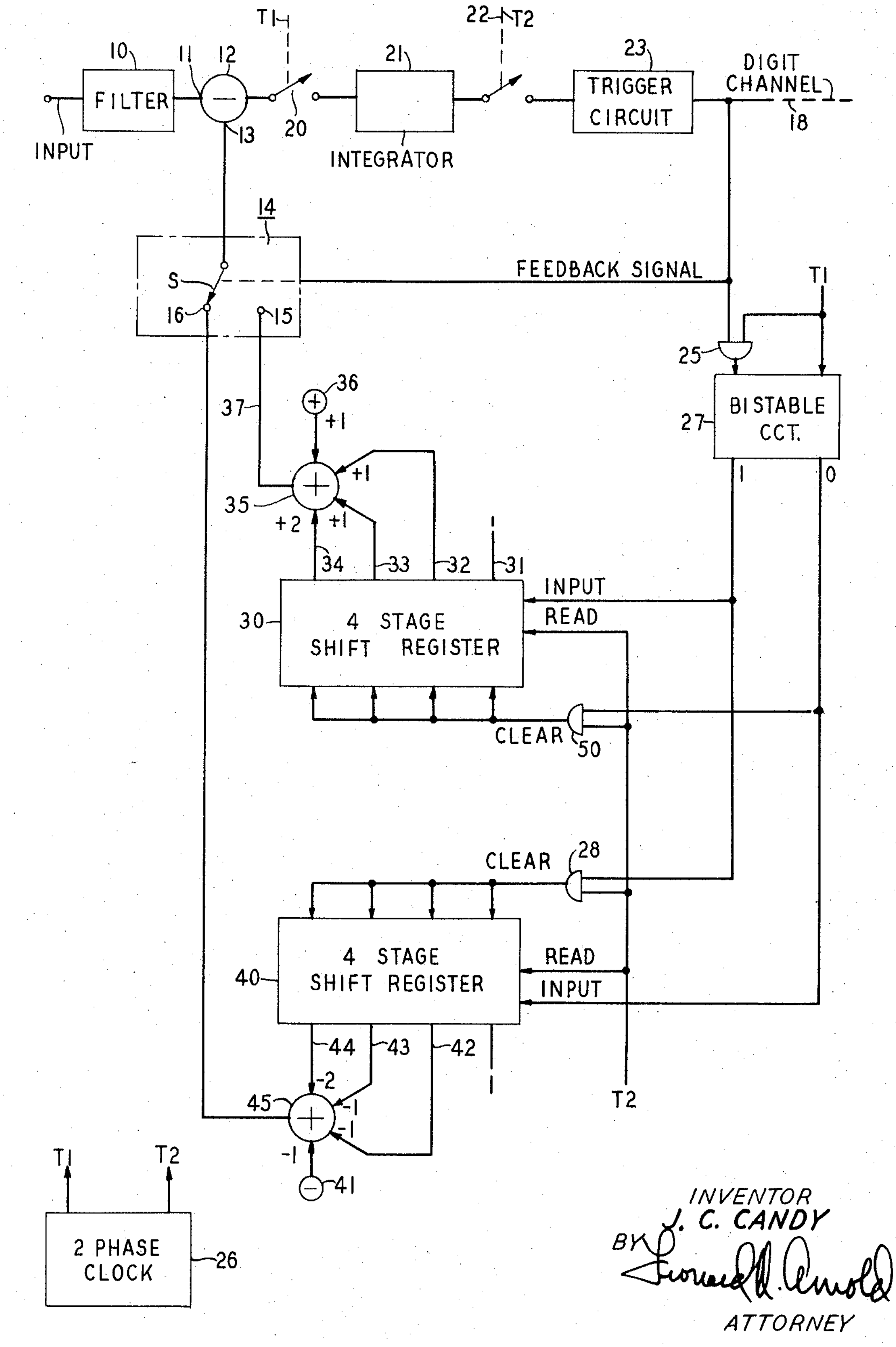
FIG. 1 is a block diagram of a pulse transmitter embodying the present invention.
Figure 3:
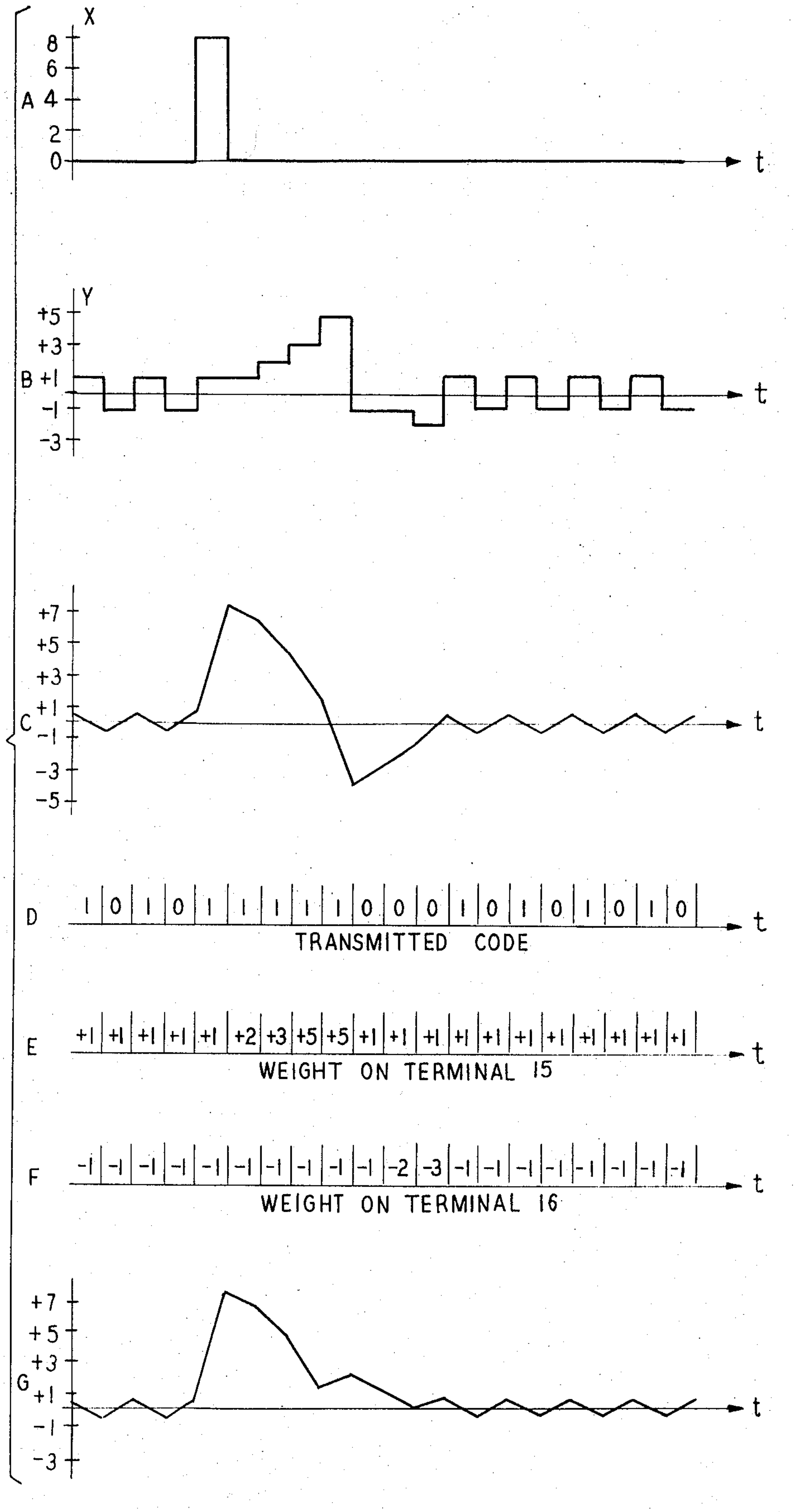
FIG. 3 is a series of waveforms useful in understanding the operation of the transmitter circuit shown in FIG.1.

Referring to FIG. 1, the input signal is applied to a pre-emphasis filter 10 which for voice and video signals, is usually a differentiating filter. An output signal from the differentiating filter 10, which is illustrated in line A of FIG. 3, is applied to one input terminal 11 of a subtraction circuit 12. The second input terminal 13 of the subtraction circuit 12 is connected to one pole of a switch 14 which provides a means of connecting either terminal 15 or terminal 16 to the input terminal 13 of the subtraction circuit 12. The switch 14 is operated in accordance with a feedback signal directly obtained from the digital channel 18. More particularly, when a pulse is generated on the digital channel 18, this pulse actuates switch 14 such that terminal 15 is connected to input 13 of the subtraction circuit 12. Conversely, when a no pulse is generated on the digital channel 18, the switch 14 serves to connect terminal 16 to input terminal 13 of subtraction circuit 12. Connected between the output of the subtraction circuit 12 and the digital channel 18 are a switch 20, an integrator circuit 21, a switch 22 and a threshold, or trigger circuit, 23. In the sequence of operation, switch 20 closes first at time T1 and the difference signal between the signals present at terminals 11 and 13 is then integrated by integrator circuit 21. The function of integrator circuit 21 is to maintain an arithmetic sum of the dfference between the signals at terminals 11 and 13 of subtraction circuit 12 during each interval of time when switch 20 is closed. The letter numeral combination T1 next to switch 20 in FIG. 1 indicates that that is the period of time when switch 20 is closed and this time corresponds to the beginning of a pulse period on the digital channel and terminates at the end of that pulse period. This signal is obtained from a two-phase clock 26 found at the pulse transmitter.

In accordance with a feature of this invention the weighted reference voltages are determined outside of the feedback loop by means of two shift registers 30 and 40. The output of register 30 anticipates a pulse in the next transmission time slot and the output of register 40 anticipates a no pulse in that time slot. That is to say the output of register 30 forms the weighted reference level in the event the next transmitted digital signal is a pulse, while the register 40 forms the weighted reference level in the event the next transmitted digital signal is a no pulse. In short, the output on digital channel 18 selects one or the other of the reference values. To accomplish this end, the total cycle of operation of the pulse transmitter is divided into approximately two portions with the interval of time in which switch 20 is closed corresponding to roughly one-half the cycle of operation and encompassing in time a pulse period on the digital channel. At the same time that a signal is transmitted over digital channel 18 AND gate 25 is enabled by the signal T1 obtained from the two-phase clock 26. The output terminal designated T1 from two-phase clock 26 governs both the operation of both switch 20 and AND gate 25. The signal transmitted on the digital channel 18 is then read into the bistable circuit 27. Here it is stored throughout the second portion of the cycle of operation. During this second time interval a signal is generated at output terminal T2 of clock 26 causing switch 22 to conduct, thereby interconnecting integrator circuit 21 and trigger circuit 23 so that the trigger circuit, or threshold circuit, begins to perform the threshold decision process of determining whether its input is positive or negative and whether to transmit a pulse or a no pulse respectively on digital channel 18. In the meantime during this second portion of the operating cycle the last transmitted digital signal stored in bistable circuit 25 is fed into the shift registers 30 and 40 under the control of the T2 output signal from clock 26 to set up the two signals on terminals 15 and 16. The output of the decision circuit 23 then selects one of these by means of switch 14 and feeds it to the subtraction circuit 20 in readiness for the next cycle.

On startup the first signal transmitted on digital channel 18 may be either a pulse or a space depending upon the residual signal in the integrator 21 so that the first signal read into the bistable circuit 27 is not governed by the input signal to the transmitter circuit. Assume for the sake of explanation that the integrator output was positive during the first digital pulse period so that a "1" is initially stored in bistable circuit 27. When signal T2 is generated by clock 26 the read inputs of registers 30 and 40 are enabled and this signal is read into register 30 whose input terminal is connected to the "1" output terminal of bistable circuit 25. At the same time register 40 is cleared by means of the signal generated by gate 28 also connected to the "1" output of bistable circuit 27. Register 30 is a four-stage shift register whose first stage has an output terminal 31 which is not connected to any other apparatus. The second, third and fourth stages have output terminals 32, 33 and 34, respectively and when these stages have a pulse stored in them a voltage is generated at their respective output terminals. The register is arranged so that the voltage generated at terminal 32 is of +1 unit of amplitude. The same voltage is generated at terminal 33. At terminal 34, however, a voltage of +2 units of amplitudes is generated. The three terminals 32, 33 and 34 are each connected to an input terminal of a four-input terminal summing circuit 35 whose fourth input terminal is connected to a source 36 of a voltage of +1 units of amplitude such that at least +1 unit of amplitude is applied to the summing circuit 35 at all times. The output terminal 37 of summing circuit 35 is directly connected to terminal 15 of switch 14 so that shift register 30 and summing circuit 35 serve to generate for application to the subtraction circuit 12 a weighted voltage in accordance with the number of consecutive pulses generated on the digital channel 18. For example, a first generated digital pulse serves to set the first stage of the shift register whose output terminal 31 is not connected to any other apparatus. However, summing circuit 35 still generates a +1 output voltage for application to terminal 15 which is connected to subtraction circuit 12 due to the fact that whenever the transmitted digital signal is a pulse the feedback signal applied to switch 14 serves to connect switch 14 to terminal 15. A second consecutive digital pulse serves to set the second stage of the shift register as well as the first one and now a second voltage of plus one units of amplitude is applied to summing circuit 35. Thus, the weighted voltage at terminal 15 is +2 units of amplitude. For a third consecutive pulse a third voltage of +1 unit of amplitude is generated at terminal 33 serving to increase the weighted voltage to +3 units of amplitude. Finally, four or more consecutive pulses serve to cause all four stages of the shift register to contain "1's" so that the weighted voltage applied to input terminal 15 of switch 14 is +5 units of amplitude and if the next decision generates a pulse this weighted reference value of +5 units is fed to terminal 13 of subtraction circuit 12. Therefore, the signal at the output terminal of pre-emphasis filter 10 must be greater than +5 units of amplitude in order for the signal applied to integrator circuit 21, when switch 20 closes to be large enough to make the input to the trigger circuit positive and thus produces a pulse at its output. The pre-emphasized signal 11 tends to increase the signal accumulated in the integrator and the feedback signal 13 tends to reduce it towards zero. In other words, the weights 1, 1, 2, 3 and 5 are applied to input terminal 13 of subtraction circuit 12 in response to the first, second third, fourth and fifth consecutive pulses transmitted over the digital channel 18 and for such a string of pulses to be generated on that digital channel the pre-emphasized input must be greater than those various levels in order to produce a pulse on the digital channel. When the output of the integrator becomes negative the string of consecutive pulses transmitted on the digital channel is broken by the presence of a transmitted no pulse, a "0" is stored in bistable circuit 25, and this functions to enable AND gate 50 at the next time T2 and thereby clears all the stages in the shift register 30. The weighting is then again performed in accordance with a weighted value of +1.

A second four-stage shift register 40 is employed in order to generate negative weighted reference values in response to strings of no pulses for application to terminal 16 of switch 14. The circuitry associated with shift register 40 corresponds to that associated with shift register 30. The "0" output terminal of bistable circuit 27 is applied to the input terminal of the shift register 40 so that in response to the second transmitted no pulse, or "0," the weighted value increases from −1 unit of amplitude supplied by voltage source 41 to −2 units of amplitude supplied by the combination of the voltage from source 41 and that supplied by the −1 unit of amplitude signal at output terminal 42 of register 40. Similarly output terminals 43 and 44 generate −1 and −2 units of amplitude, respectively, in order to complete the negative weighted values employed in the apparatus. The first occurring pulse on the digital channel causes a "1" to be generated at the "1" output terminal of bistable circuit 27 so that the shift register 40 is cleared by the output of gate 28 and the succeeding signals at terminal 11 are encoded in accordance with the weighted values +1 or −1, until another string of more than two pulses or no pulses are generated for transmission, then the weights increase again.

It is most important to note that the apparatus shown in FIG. 1 has the weighting circuit comprising the bistable circuit 25 and the shift registers 30 and 40 together with the associated apparatus outside the direct feedback path between digital channel 18 and switch 14. That is to say, the weighting circuit is not in the same feedback path as the signal employed to actuate switch 14. As a result, each signal whether it be a pulse or a no pulse on the digital channel 18 is fed to actuate the weighting apparatus in anticipation of the next decision such that the integration performed on the next succeeding threshold decision is affected by either of the weighted voltages generated by summing circuits 35 and 45.

In other words, thereshold decisions are not used immediately to change the weight value during the first half cycle of operation but are fed directly back to select one of the weights already set up on terminals 15 and 16 by previous threshold decisions. The selected weight is fed to the integrators via subtractor 12 and switch 20 so as to reduce the accumulated signal in the integrator. During the second half cycle, corresponding to clock signal T2, the decision is used to set up new weight values in readiness for the next decision as to whether to transmit a pulse or no pulse. Because at this time, it has not yet been determined whether this next decision is a "1" or a "0," weights appropriate to both values must be set up. The cycle then repeats.

By this means the weighting circuits are actuated at the same time as the decision is being made instead of in a time sequence as would be necessary if the weighting were cascaded in the feedback loop. This simultaneous operation of circuit functions enable the circuit to perform at higher speed, and eliminates the low frequency instability discussed heretofore.

Figures 2, 6:
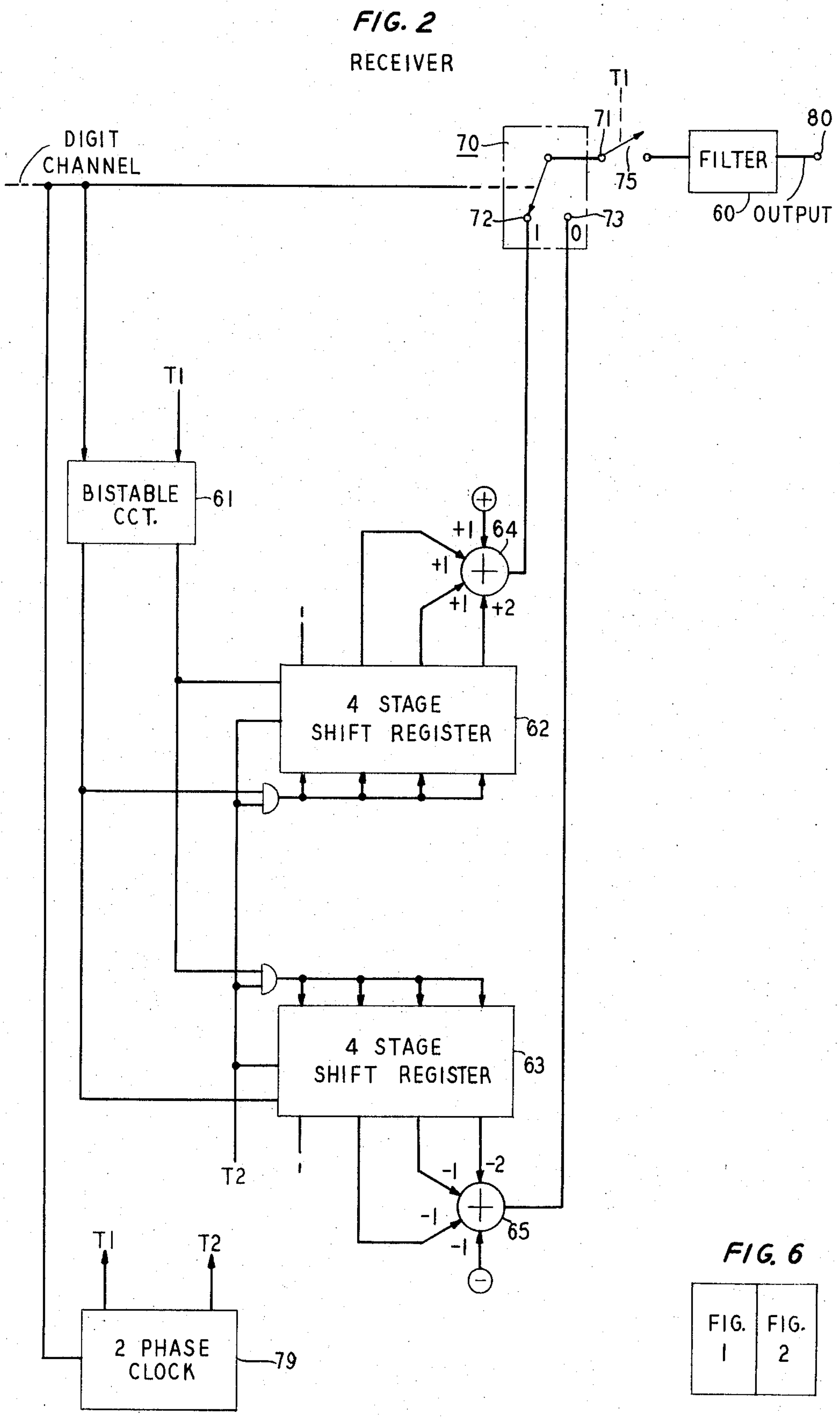
FIG. 2 is a block diagram of a pulse receiver embodying the present invention.
FIG. 6 illustrates the placement of FIGS. 1 and 2 in order to obtain a block diagram of a complete transmission system embodying the invention.

A pulse transmission receiver embodying the invention is shown in FIG. 2. In order to recover the original signal it is necessary to apply to a de-emphasis filter 60 a signal corresponding to the signal present at the input terminal 13 of subtraction circuit 12 at the transmitter. In accordance with this invention this signal may be obtained by operating on the transmitted digital signal in exactly the same manner at the reciver as was done at the pulse transmiter. A bistable circuit 61, two four-stage shift registers 62 and 63 and two summing circuits 64 and 65 are connected in exactly the same manner as the apparatus shown in FIG. 1 which generates the weighted reference voltages. In addition, the digital signal is directly applied to a switch 70 which corresponds to switch 14 and which connects terminal 71 to either of two poles 72 and 73 in accordance with whether the transmitted signal is a pulse or a no pulse, respectively. Because this apparatus corresponds exactly to the apparatus at the transmitting terminal used to generate the weighted reference signals, the signal appearing at terminal 71 corresponds, with the exception of errors due to transmission to the signal present at terminal 13.

During each transmited signal a two-phase clock 79 generates a signal T1 closing switch 75 and the signal at terminal 71 is applied through switches 75 to the de-emphasis filter 60 whose characteristics are the inverse of those of filter 10 employed at the transmitting terminal. As a result, the signal appearing at output terminal 80 corresponds to the input signal applied to the filter 10 at the transmitter.

Figure 4:
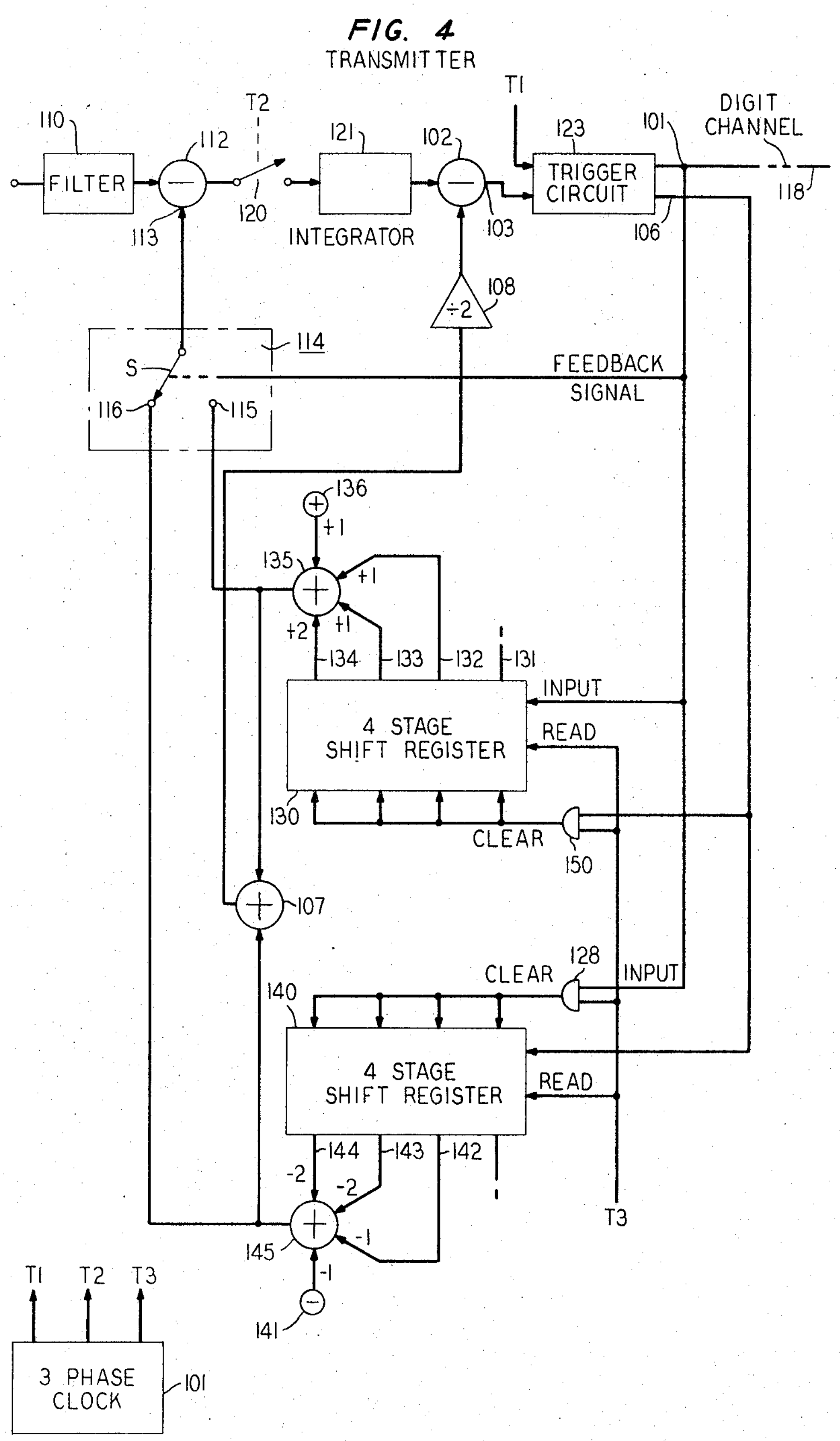
FIG. 4 is a block diagram of a second pulse transmitter embodying the present invention.
Figures 5, 7:
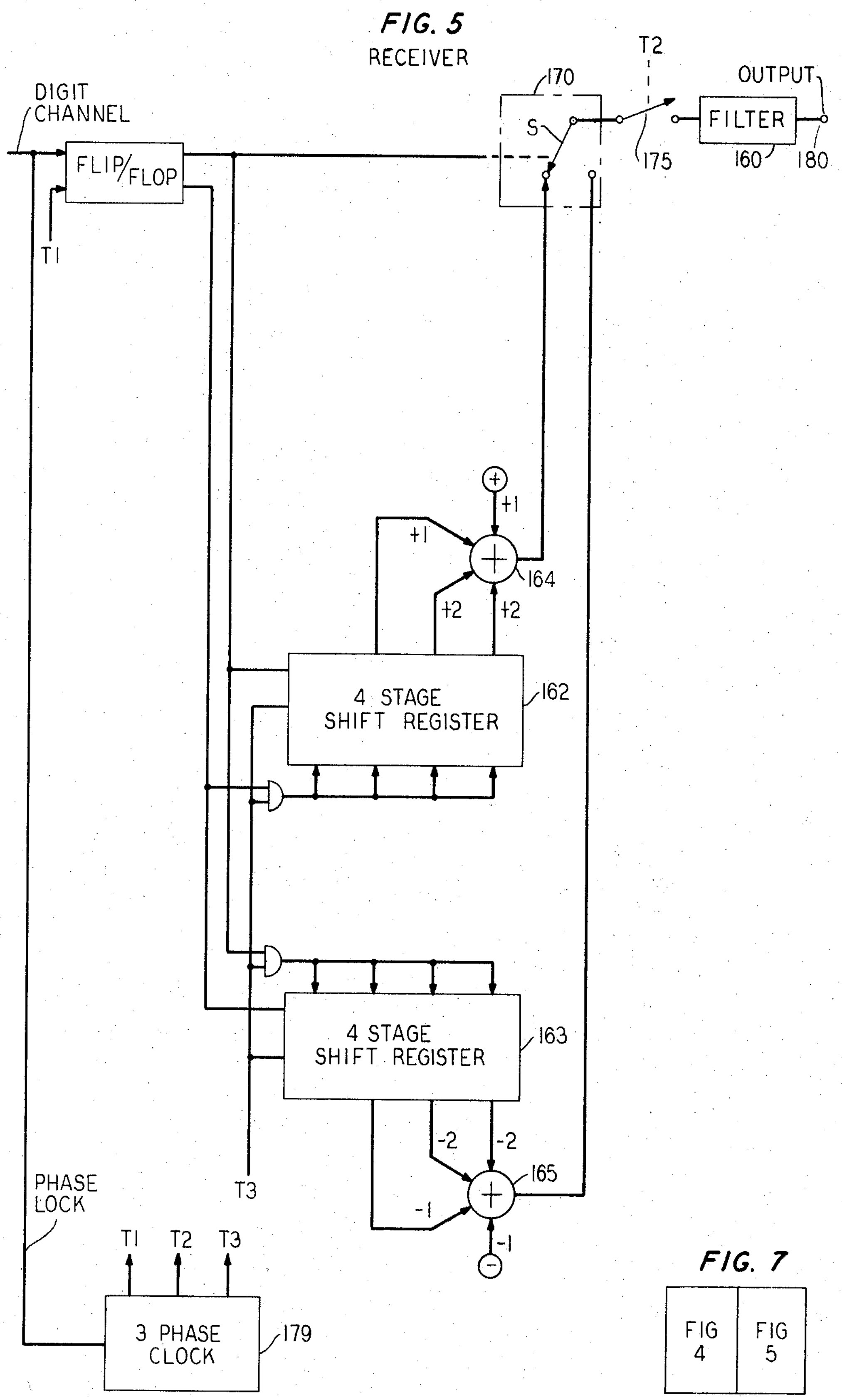
FIG. 5 is a block diagram of a second pulse receiver embodying the present invention.
FIG. 7 illustrates the placement of FIGS. 4 and 5 in order to obtain a block diagram of a complete transmission system embodying the invention.

FIG. 3 shows a series of waveforms in lines A through F which are useful in understanding the embodiment of the invention shown in FIGS. 1 and 2, and provide a background for understanding the embodiment of the invention shown in FIGS. 4 and 5. In line A of FIG. 3 there is illustrated a typical signal appearing at the output of the pre-emphasis filter 10 at the transmitting terminal. As explained above, the signal appearing at terminal 13 is intended to be such as to cause the sum of the difference signal applied to the intergrator 21 to approach zero. The signal applied to terminal 13 of subtraction circuit 12 is shown in line B and the running sum of the signals applied to the integrator circuit is shown in line C. In line D the transmitted code on digital channel 18 is shown with a "1" indicating a pulse and a "0" indicating a no pulse. As is readily apparent whenever the output of the integrator circuit 21 is positive a pulse is generated and whenever the output of the integrator circuit is negative a "0" is generated. In line E is shown the weight of the reference signals applied to terminal 15 while in line F is shown the weight of the signal applied to terminal 16. As explained above, the choice as to whether to use the weight at terminal 15 or the weight at terminal 16 is determined on the basis of whether a pulse or a no pulse is transmitted in the succeeding time slot. Thus, each time a pulse is transmitted the weight at terminal 15 is employed for encoding the next signal to be transmitted, while each time a "0" is transmitted the weight employed to encode the next signal is that found at terminal 16.

As stated above the weights having been determnied in accordance with whether a pulse or a no pulse was generated in the preceding time slot and further determined by the number of consecutive pulses or spaces generated in the immediately preceding time slots. Thus, for example, in the fifth time slot of the illustrated transmitted code shown in line D of FIG. 3 a pulse is transmitted because the integrator circuit output is positive. Furthermore, a pulse is transmitted in the succeeding four time slots beacuse the integrator circuit output continues to be positive so that the fifth through ninth time slots contain pulses. Because the weighting employed in this embodiment of the invention is 1, 1, 2, 3, 5, the result is that at the end of the ninth time slot a voltage of +5 units of amplitude appears at the output terminal 37 of summing circuit 35. As a result, the weighted reference value +5 is applied to terminal 13 of subtraction circuit 12 and this weighted reference voltage is subtracted from the input signal in the process of encoding the tenth time slot of the transmitted code. The weighted reference voltages shown in line B represent the weighted values applied to terminal 13. Because at the time that a decision was made in encoding the ninth time slot the integrator output shown in line C while still positive in value was positive but close to "0" the +5 units of amplitude when subtracted from the input signal present at terminal 11 in encoding the tenth time slot results in the integrator output dropping in value to a value of almost —4 as is shown in line C of FIG. 3. As a result, the integrator output has overshot the desired "0" level which it was attempting to approach in order to insure accuracy of transmission. Consecutive "0's" are then generated in order for the integrator output to have subtracted from it values such that it again begins to aproach "0." The overshoot in the integrator circuit output is undesirable and results in transmission error.

It has been discovered that to a large degree the error resulting from the overshoot in the output of the integrator circuit can be eliminated. In accordance with this invention this error is minimized by averaging the weighted reference levels determined by the shift registers 30 and 40 and applying the average of these reference levels to a subtraction circuit connected to the output of the integrator circuit preceding the trigger circuit. The decision as to whether to generate a pulse or a no pulse is then based on whether the output of the integrator is more positive or more negative than the average of the weighted reference values.

The improved encoding apparatus shown in FIG. 4 eliminates to a very large degree the overshoot associated with weighted encoders. This overshoot is eliminated, as stated above, by averaging the weighted reference levels and generating a pulse when the output of the integrator circuit at the transmitter is more positive than the average weighted value and generating a no pulse when the output of the integrator circuit at the transmitter is negative with respect to the average of the weighted reference value. The net effect of such a determination is illustrated in line G of FIG. 3. Whereas the output of the integrator shown in line C overshot the "0" reference level it was attempting to reach in the process of encoding the tenth transmitted pulse signal, this overshoot is eliminated in line G. In accordance with a feature of the invention embodied in the apparatus shown in FIG. 4 the reference value +5 at terminal 115 (which corresponds to terminal 15 in FIG. 1) is averaged with the weighted reference value —1 at terminal 116 (which corresponds to terminal 16 in FIG. 1) so that the average weighted reference value is +2. Since at that instant in time the output of the integrator circuit as shown in line C of FIG. 3, is not greater than +2 the circuitry shown in FIG. 4 operates upon the signal at the output of the integrator circuit so that the trigger circuit does not generate a pulse and the weighted reference value +5 is not used to encode the pulse signal. Rather the circuitry generates a no pulse so that the next weighted reference value employed is a —1. The result is, as shown in line G of FIG. 3 that there is a slight increase in the integrator circuit output, but the relatively large overshoot is eliminated and the integrator output again rapidly approaches the "0" level.

In order to operate in the manner broadly described above the apparatus shown in FIG. 1 is modified to some degree in order to divide the operating cycle into three parts and in order to provide apparatus to determine whether the output of the integrator circuit is more positive or negative with respect to the weighted average of the reference values. The resulting apparatus which is shown in FIG. 4 has components which correspond to that shown in FIG. 1 and each such component has a reference numeral one hundred numbers higher than that shown in FIG. 1. Thus, for example, the filter 110 corresponds to the filter 10 shown in FIG. 1. In order to divide the operating cycle into three parts a three-phase clock circuit 101 is used in place of the two-phase clock circuit 26 used in the embodiment shown in FIG. 1. The first portion of the cycle begins with the generation of a narrow pulse at time T1 by clock 101. A short time thereafter a wider pulse T2 is generated and this is followed by another relatively narrow pulse T3. The cycle then repeats.

At time T1 a trigger circuit 123 is enabled and generates a pulse output at terminal 101 for transmission over the digital channel 118 when the input to the trigger circuit 123 from a subtractor circuit 102 generates at its output terminal 103 a signal which is positive. Similarly at time T1 the trigger circuit generates a no pulse at terminal 101 when the output at terminal 103 of subtraction circuit 102 is negative. In addition, the output signal at terminal 101 is also transmitted back through the feedback signal path to control the operation of switch 114 so that terminal 115 is connected to input terminal 113 of subtraction circuit 112 when a pulse is transmitted and is connected to terminal 116 when a no pulse is transmitted. The trigger circuit 123 also has a second output terminal 106 at which a complementary output signal with respect to the signal at terminal 105 is present. This signal is applied to one input terminal of AND gate 127 and to the input terminal of shift register 140. Shift registers 130 and 140, together with adder circuit 135 and 145, and voltage sources 136 and 141, correspond in their operation in all respects to the corresponding apparatus having reference numerals one hundred units lower in FIG. 1 and the signals appearing at terminal 115 and 116 correspond to those which are generated at terminals 15 and 16 in FIG. 1 when there is no difference in the weighting employed by virtue of the additional apparatus to be described below which avoids the heretofore mentioned problem of overshoot. The outputs of adder circuits 135 and 145 are also applied to an adder circuit 107 whose output is connected to a divide-by-two circuit 108 whose output signal is applied to one input terminal of substraction circuit 101. As a result, the weighted reference values determined by registers 130 and 140 are averaged and applied to one input terminal of the subtraction circuit.

The sequence of operation begins with the generation of the narrow pulse T1 at which time the trigger circuit determines whether the input from subtractor circuit 102 is positive or negative. If the input signal is positive, indicating that the output of the integrator circuit 121 is more positive than the weighted average of the reference values, the trigger is set and generates an output pulse, if the input signal is negative the trigger circuit is cleared so that no output pulse is generated. As previously stated the result is transmitted and also used to position switch 114 so that at time T2, when a wider pulse is generated, either of the two weighted reference values is applied to the subtractor circuits 112 so that these values are subtracted from the pre-emphasized input signal and the resulting difference fed into the integrator circuit 121 at time T2. At time T3 the decision determined by trigger circuit 123 is fed into shift registers 130 and 140.

As before shift registers 130 and 140 are connected so that a transmitted "1" is read into register 130 and serves to clear register 140. Conversely, the transmitted "0" is read into register 140 and is used to clear register 130.

As before the aim of the transmitting apparatus is to make equal the signals applied to subtractor circuit 112. When this is accomplished then by merely reversing the weighting process in receiver apparatus such as that shown in FIG. 5 the signal applied to the input of subtractor circuit 112 from switch 114 is reproducible at the output of switch 175 and this signal applied to a de-emphasis filter 160 will result in the original analog signal being present at the output terminal 180 of the de-emphasis filter. In practice, of course, there will be some difference between the signal applied to the input of the de-emphasis filter and the signal present at input 113 of subtractor circuit 112. It is this difference which is accumulated in subtractor circuit 121 and determines the trigger decision.

The reason that the apparatus shown in FIGS. 4 and 5 functions to reduce overshoot previously encountered is because in making a choice as to whether to employ the weighted reference value present at terminal 115, or that present at terminal 116, the transmitting apparatus first determines whether or not the accumulated error in subtractor circuit 121 is greater or less than the weighted average of the two reference values. In this way the overshoot is greatly eliminated.

It is to be understood of course that the above described arrangements are merely illustrative of the application of the principles of the invention. Numerous other arrangements may be devised by those skilled in the art without departing from the spirit and scope of the invention.

What is claimed is:

1. A feedback coder comprising, in combination, a filter connected to receive analog input signals, a subtraction circuit connected to receive the output from said filter at one input terminal and weighted reference signals at a second input terminal, an integrator circuit, first switching means connecting the input of said integrator circuit to the output of said subtraction circuit so that when said first switching means conducts said integrator samples the difference between the analog input signal and the weighted reference signal, a trigger circuit, second switching means connecting the output of said integrator circuit to the input of said trigger circuit so that said trigger circuit generates a digit output signal at the time that said second switching means is conductive, third switching means having two input terminals and an output terminal connected to the weighted reference signal input terminal of said subtraction circuit, a pair of shift registers to generate reference voltages at output terminals, means connecting the output terminals of each of said shift registers to a respective one of said two input terminals of said third switching means, a bistable circuit connected to receive the output of said trigger circuit at the same time that said first switching means is actuated, the output terminals of said bistable circuit being connected to said shift registers so that the shift registers generate weighted reference voltages in accordance with the digit output signal, and a feedback signal path from the output of said trigger circuit to control the operation of said third switching means so that the weighted reference signal applied to said subtraction circuit is determined by the generated signal in the preceding time slot.

2. Apparatus in accordance with claim 1 wherein said shift registers and said means connecting the output terminals of said shift registers to said input terminals serve to generate weighted reference voltages of values +1, +1, +2, +3, +5 . . . +5 in response to respective consecutive 1st, 2nd, 3rd, 4th, 5th . . . $n^{th}$ pulses generated by said trigger circuit and weighted reference voltages of values −1, −1, −2, −3, −5 . . . −5 in response to respective consecutive 1st, 2nd, 3rd, 4th, 5th . . . $n^{th}$ no pulses generated by said trigger circuit.

3. A fedback coder having a weighting network connected in parallel with the feedback path comprising in combination, a filter connected to receive analog input signals, a subtraction circuit connected to receive the output of said filter at one input terminal and weighted reference signals generated by a weighting network connected between the output of the coder and said subtraction circuit at a second input terminal, first switching means connected to receive the output of said subtraction circuit said first switching means being rendered conductive during a predetermined portion of the operating cycle of the coder, an integrator circuit connected to the output of said first switching means so that said integrator circuit generates at its output terminal a signal representing the sum of the differences of the signals applied to said first switching means, second switching means connecting the output of said integrator circuit to the input of a trigger circuit, said second switching means being rendered conductive during a second predetermined portion of the operating cycle of the coder so that the trigger circuit generates at its output terminal a digit output signal at the time that said second switching means is conductive, third switching means having two input terminals and an output terminal connected to the weighted reference signal input of said subtraction circuit, a feedback signal path from the output of said trigger circuit to control the operation of said third switching means so that a first input terminal of said third switching means is connected to the weighted reference voltage input of said subtraction circuit when said trigger circuit generates a pulse and a second input terminal of said third switching means is connected to the weighted reference input of said subtraction circuit when said trigger circuit generates a no pulse, a bistable circuit which is enabled at the time that said first switching means is rendered conductive so that said bistable circuit has stored therein the output of said trigger circuit, a pair of shift registers, a first of said pair of shift registers being connected to said bistable circuit so that said first shift register stores therein consecutive pulses which were transmitted over the transmission channel, the second shift register being connected to the output of said bistable circuit so that said second shift register has stored therein consecutive no pulses which were transmitted over said transmission channel, said first and second shift registers generating reference voltages at their output terminals in accordance with the number of consecutive pulses stored in said first shift register and no pulses stored in said second shift register, a first adder circuit connected to the outputs of said first shift register, the output of said first adder circuit being connected to said first input terminal of said third switching means so that a weighted reference voltage is applied to said first input terminal of said third switching means in accordance with the number of consecutive pulses transmitted, a second adder circuit having its input terminal connected to the output terminals of said second shift register so that said second adder circuit generates at its output terminal which is connected to said second input terminal of said third switching means a weighted reference voltage in accordance with the number of consecutive no pulses transmitted on said transmission channel.

4. Apparatus in accordance with claim 3 wherein said shift registers and said adder circuits serve to generate weighted reference voltages of values +1, +1, +2, +3, +5 . . . +5 in response to respective consecutive 1st, 2nd, 3rd, 4th, 5th . . . $n^{th}$ pulses generated by said trigger circuit and weighted reference voltages of values −1, −1, −2, −3, −5 . . . −5 in response to respective consecutive 1st, 2nd, 3rd, 4th, 5th . . . $n^{th}$ no pulses generated by said trigger circuit.

5. In a transmission system, a feedback coder comprising, in combination, a filter connected to receive analog input signals, a subtraction circuit connected to receive the output from said filter at one input terminal and weighted reference signals at a second input terminal, an integrator circuit, first switching means connecting the input of said integrator circuit to the output of said subtraction circuit so that when said first switching means conducts said integrator samples the difference between the analog input signal and the weighted reference signal, a trigger circuit, second switching means connecting the output of said integrator circuit to the input of said trigger circuit so that said trigger circuit generates a digit output signal at the time that said second switching means is conductive, third switching means having two input terminals and an output terminal connected to the weighted reference signal input terminal of said subtraction circuit, a pair of shift registers to generate reference voltages at output terminals, means connecting the output terminals of each of said shift registers to a respective one of said two input terminals of said third switching means, a bistable circuit connected to receive the output of said trigger circuit at the same time that said first switching means is actuated, the output terminals of said bistable circuit being connected to said shift registers so that the shift registers generate weighted reference voltages in accordance with the digit output signal, and a feedback signal path from the output of said trigger circuit to control the operation of said third switching means so that the weighted reference signal applied to said subtraction circuit is determined by the generated signal in the preceding time slot, a transmission channel for transmitting the digit output signal from said trigger circuit, a receiver comprising, in combination, first means to generate weighted reference voltages in accordance with the number of consecutive pulses transmitted over said transmission channel, second means to generate weighted reference voltages in accordance with the number of consecutive no pulses transmitted over said transmission channel, switching means having two input terminals connected to receive said weighted reference voltages and an output terminal, means to actuate said switching means so that said first means to generate a reference voltage is connected to said switching means output terminal when the received signal is a pulse and said second means to generate a reference voltage is connected to said switching means output terminal when the received signal is a no pulse, and a deemphasis filter connected to the output terminal of said switching means.

6. A direct feedback decoder comprising, in combination, a bistable circuit connected to receive and store digital input signals at first predetermined times, a first shift register connected to the output of said bistable circuit to store consecutive pulses at second predetermined times, a second shift register connected to the output of said bistable circuit to store consecutive no pulses at second predetermined times, a first summing network connected to the outputs of said first shift register to generate at an output terminal a weighted reference voltage determined by the number of consecutive received pulses, a second summing network connected to the outputs of the second shift register to generate at an output terminal a weighted reference voltage determined by the number of consecutive received no pulses, switching means having two input terminals and an output terminal, said output terminal being connected to said first and second input terminals in accordance with whether a pulse or a no pulse is present in said digital input signal, said first input terminal being connected to the output of said first summing network and said second input terminal being connected to the output of said second summing network, second switching means being connected to the output of said first switching means, said second switching means being rendered conductive during said first predetermined times so that a signal is generated at the output of said second switching means which contains information as to the analog representation of the digital signal, and a filter connected to receive the output signal from said second switching means.

7. Apparatus in accordance with claim 6 wherein said shift registers and said summing networks serve to generate weighed reference voltages of values +1, +1, +2, +3, +5 . . . +5 in response to respective consecutive 1st, 2nd, 3rd, 4th, 5th . . . $n^{th}$ pulses in said digital signal and weighted reference voltages of values −1, −1, −2, −3, −5 . . . −5 in response to respective consecutive 1st, 2nd, 3rd, 4th, 5th . . . $n^{th}$ no pulses in said digital signal.

8. A direct feedback coder having a weighting network connected in parallel with the feedback path comprising, in combination, a filter connected to receive analog input signals, a first subtraction circuit connected to receive the output of said filter at one input terminal and weighted reference signals generated by a weighting network connected between the output of the coder and said subtraction circuit at a second input terminal, first switching means connected to receive the output of said subtraction circuit which is rendered conductive during a first predetermined portion of the operating cycle of the coder an integrator circuit connected to the output of said first switching means so that said integrator circuit generates at its output terminal a signal representing the sum of the differences of the signals applied to said first switching means, a second subtraction circuit having two input terminals a first of which is connected to receive the output signal of said integrator circuit and the second of which is connected to receive the average of two weighted reference signals, a trigger circuit connected to the output terminal of said second subtraction circuit, said trigger circuit being enabled during a second predetermined portion of the operating cycle of said coder, said second predetermined portion of the operating cycle occurring immediately prior to said first predetermined portion of the operating cycle so that during said second predetermined portion of the operating cycle the trigger circuit generates at its output terminals digital output signals at the time that said second switching means is conductive, third switching means having two input terminals and an output terminal connected to the weighted reference signal input of said first subtraction circuit, a feedback signal path from the output of said trigger circuit to control the operation of said third switching means so that a first input terminal of said third switching means is connected to the weighted reference voltage input of said first subtraction circuit when said trigger circuit generates a pulse at one of its output terminals and a second input terminal of said third switching means is connected to the weighted reference input of said first subtraction circuit when said trigger circuit generates a no pulse at a first of its output terminals, a pair of shift registers, a first of said pair of shift registers being connected to said trigger circuit so that said first shift register stores during a third predetermined portion of said operating cycle consecutive pulses which have been transmitted over the transmission channel, the second shift register being connected to the output of said trigger circuit so that said second shift register stores during said third predetermined portion of said operating cycle consecutive no pulses which have been transmitted over said transmission channel, said first and second shift registers generating reference voltages at their output terminals in accordance with the number of consecutive pulses stored in said first shift register and no pulses stored in said second shift register, a first adder circuit connected to the outputs of said first shift register, the output of said first adder circuit being connected to said first input terminal of said third switching means so that a weighted reference voltage is applied to said first input terminal of said third switching means in accordance with the number of consecutive pulses transmitted, a second adder circuit having its input terminal connected to the output terminals of said second shift register so that said second adder circuit generates at its output terminal which is connected to said second input terminal of said third switching means a weighted reference voltage in accordance with a number of consecutive no pulses transmitted on said transmission channel, a third adder circuit connected to the outputs of said first and second adder circuits for adding the two weighted reference voltages generated at any time at the output of said first and second adder circuits, a divide by two circuit connected to the output of said third adder circuit to average the output of said adder circuit, the output of said divide-by-two circuit being applied to the second input terminal of said second subtraction circuit so that said trigger circuit generates an output pulse only when the output of said integrator circuit is more positive than the average of the weighted reference voltages and generates a no pulse when the output of said integrator circuit is more negative than the average of said weighted reference voltages.

9. A direct feedback decoder comprising, in combination, a bistable circuit connected to receive and store digital input signals at first predetermined times, a first shift register connected to the output of said bistable circuit to store consecutive pulses in said digital input signal at second predetermined times, a second shift register connected to the output of said bistable circuit to store consecutive no pulses of said digital input signal at second predetermined times, a first summing network connected to the outputs of said first shift register to generate at an output terminal a weighted reference voltage determined by the number of consecutive received pulses, a second summing network connected to the outputs of said second shift register to generate at an output terminal a weighted reference voltage determined by the number of consecutive received no pulses, switching means having two input terminals and an output terminal, said output terminal being connected to said first and second input terminals in accordance with whether a pulse or a no pulse is generated at the output of said bistable circuit, said first input terminal being connected to the output of said first summing network and said second input terminal being connected to the output of said second summing network, second switching means being connected to the output of said first switching means, said second switching means being rendered conductive during third predetermined times of said operating cycle, said third predetermined times occurring between said first and said second predetermined times, so that a signal is generated at the output of said second switching means which contains information as to the analog representation of the digital signal, and a filter connected to receive the output signals from said second switching means.

References Cited

UNITED STATES PATENTS

| | | | |
|---|---|---|---|
| 3,393,364 | 7/1968 | Fine | 325—38 |
| 3,500,441 | 3/1970 | Brolin | 179—15 |

ROBERT L. GRIFFIN, Primary Examiner

B. V. SAFOUREK, Assistant Examiner

U.S. Cl. X.R.

325—62; 332—11; 334—14